US006164512A

United States Patent [19]

Raffoni

[11] Patent Number: 6,164,512

[45] Date of Patent: Dec. 26, 2000

[54] APPARATUS FOR MANUFACTURING RECTANGULAR FRAMES

[76] Inventor: Giuseppe Raffoni, Viale D. Bolognesi 24, 47100 Forli', Italy

[21] Appl. No.: 09/546,435

[22] Filed: Apr. 10, 2000

[30] Foreign Application Priority Data

May 26, 1999 [IT] Italy ................................ BO99A0289

[51] Int. Cl.[7] ................................ B23Q 3/00; B27F 7/09

[52] U.S. Cl. ........................... 227/152; 227/140; 227/148

[58] Field of Search ............................ 227/152, 99, 100, 227/104, 148, 140, 150, 153, 154

[56] References Cited

U.S. PATENT DOCUMENTS

| | | | |
|---|---|---|---|
| 4,830,257 | 5/1989 | Lin | 227/152 |
| 4,876,787 | 10/1989 | Ditty et al. | 227/152 |
| 5,191,706 | 3/1993 | Cosden | 227/152 |
| 5,816,467 | 10/1998 | Dunn | 227/140 |
| 6,010,053 | 1/2000 | Werfeli | 227/148 |

*Primary Examiner*—Scott A. Smith
*Attorney, Agent, or Firm*—Guido Modiano; Albert Josif; Daniel O'Byrne

[57] ABSTRACT

An apparatus for manufacturing rectangular frames composed of strips which are assembled by way of mutual joining elements which are driven into them by stapling machines so as to straddle the joints formed by mating the strips at right angles, which comprises: a horizontal beam which is supported so that it is rotatable centrally about a vertical axis so as to form two arms which lie diametrically with respect to the vertical axis, each arm being provided with sliding guides for respective carriages; two levers, which are articulated to each one of the carriages about axes which are parallel to the vertical axis; a grip element for a respective one of the strips that constitute the frame being mounted on each one of the levers; elements for actuating the grip elements, the levers, the carriages and the beam so that in a first position of the beam, the grip elements are located in a position for picking up the strips to be assembled; in a second position, the levers are rotated so that the strips picked up by the elements of each pair of levers are mated at right angles; in a third position, the carriages are mutually adjacent so as to form a frame; and in a fourth position, the corners of the frame are arranged on the stapling machines.

14 Claims, 14 Drawing Sheets

APPARATUS FOR MANUFACTURING RECTANGULAR FRAMES

BACKGROUND OF THE INVENTION

The present invention relates to an apparatus for manufacturing rectangular frames.

The strips that form frames are currently assembled by successive handling operations performed by operators, who place the strips in position and fix them one another by way of adapted stapling machines. However, conventional assembly methods are slow, troublesome and expensive owing to the fact that they require considerable labor.

SUMMARY OF THE INVENTION

The aim of the present invention is to automate the manufacture of frames starting from pre-cut strips which are stacked in appropriately provided magazines.

Within the scope of this aim, an object of the present invention is to provide an apparatus which is versatile in use in relation to the possibility to provide frames in different sizes.

This aim, this object and others which will become apparent hereinafter, are achieved by an apparatus for manufacturing rectangular frames composed of strips which are assembled by way of mutual joining elements which are driven into said strips by stapling machines so as to straddle joints formed by mating said strips at right angles, characterized in that it comprises: a horizontal beam, which is supported so that it is rotatable centrally about a vertical axis so as to form two arms which lie diametrically with respect to said vertical axis, each arm of said two arms being provided with sliding guides for a respective carriage; two levers, which are articulated to each one of said carriages about axes which are parallel to said vertical axis; a grip element, mounted on each one of said levers, for a respective one of said strips that constitute said frame; means for actuating said grip elements, said levers, said carriages and said beam so that in a first position of said beam, said grip elements are located in a position for picking up the strips to be assembled; in a second position, said levers are rotated so that the strips picked up by the elements of each pair of levers are mated at right angles; in a third position, said carriages are mutually adjacent so as to form a frame; and in a fourth position, corners of said frame are arranged on stapling machines.

BRIEF DESCRIPTION OF THE DRAWINGS

Further characteristics and advantages of the present invention will become apparent from the detailed description that follows of a preferred embodiment, illustrated only by way of non-limitative example in the accompanying drawings, wherein.

DESCRIPTION OF THE PREFERRED EMBODIMENTS

Figure 1:
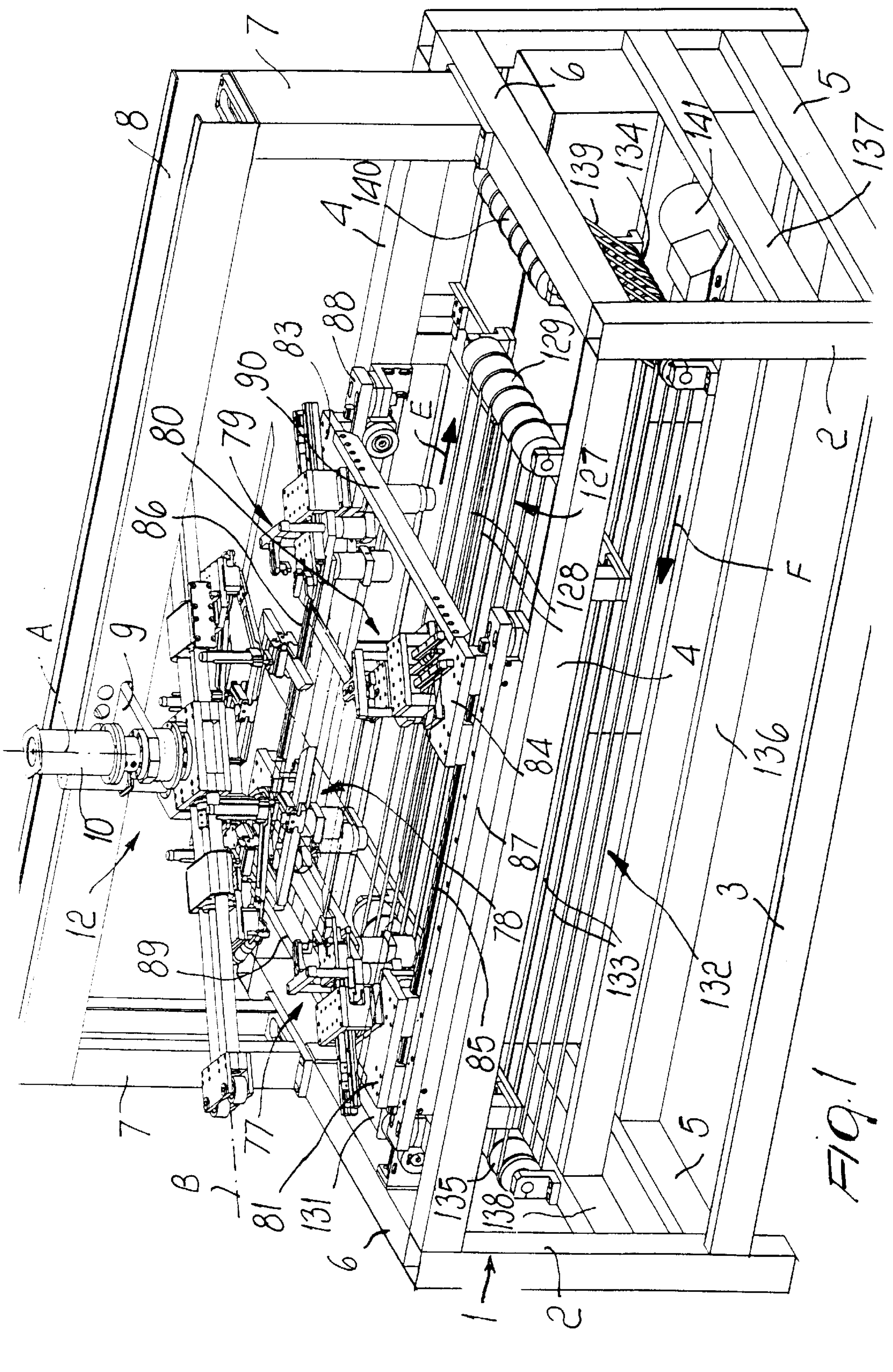
FIG. 1 is a perspective view of the apparatus according to the present invention.

With reference to the above figures, the apparatus comprises a base framework, generally designated by the reference numeral 1, which is composed of four uprights 2 arranged at the corners of an imaginary rectangle and mutually connected by lower longitudinal members 3 and upper longitudinal members 3 and by lower cross-members 5 and upper cross-members 6.

Two posts 7 rise centrally from the upper cross-members 6, and a beam 8 lies between them, forming a sort of portal with the posts.

A bracket 9 (FIG. 1) protrudes laterally from the beam 8, and a motor 10 with a vertical axis A is coupled thereon by means of a flange; a box-like prism-shaped body 11 for supporting a beam, generally designated by the reference numeral 12, is rigidly coupled to the output shaft of said motor.

The beam 12 is substantially constituted by two cylindrical bars 13 which are mutually parallel in the direction B (see FIG. 7) at right angles to the axis A and form two arms 14 and 15 which protrude by the same extent from the prism-shaped body 11 diametrically with respect to the axis A.

The bars 13 are connected, at the opposite ends, by braces 16 (FIGS. 5 and 6), from the upper and lower faces of which pairs of plates 17 protrude outwards and form, together with the braces, brackets 18 and 19 for rotatably supporting two pairs of pulleys 20 and 21 which have vertical rotation axes.

A reversible motor 22 is fitted below the box-like body 11, and its axis is parallel to the bars 13. A toothed pulley 23 is keyed to the output shaft of the motor 22, and a toothed belt 24 is engaged thereon. The belt 24 surrounds a second toothed pulley 25, which is keyed on a splined rod 26 which lies between the bar portions 13 of the arm 14, one end of said rod being rotatably supported in the box-like body 11, the opposite end extending to the vicinity of the brace 16 of the bracket 18.

A second splined rod 27 lies between the portions of the bars 13 of the arm 15: one end of said rod is supported in the box-like body 11 and the opposite end extends to the vicinity of the brace 16 of the bracket 19. The splined rods 26 and 27 are axially offset with respect to each other, and respective mutually meshing gears are keyed on their ends that extend inside the box-like body 11. The meshing gears (which are not shown in the drawing but are easily imaginable) allow to turn the rod 27 in the opposite direction with respect to the one imparted to the rod 26 by the motor 22. The splined rods 26 and 27 pass through two respective carriages 28 and 29 which are slideable on the portions of the bars 13 of the arms 14 and 15.

Respective guides 30 and 31, orientated in the directions C and D (see FIG. 7) at right angles to the bars 13, are fixed below the carriages 28 and 29, and two sliders 32 and 33 slide thereon.

The sliders 32 and 33 are constituted by plates 34 and 35 which protrude from the respective carriages 28 and 29 under the bars 13 toward the brackets 18 and 19 and support, as will become apparent hereinafter, the two assemblies designed to pick up and mutually arrange the four strips that must be assembled in order to form the frame.

The assembly related to the slider 32 comprises a rack 36 which is fixed to the plate 34 at right angles to the bars 13 and meshes with a gear 37 which is supported so that it is rotatable in the carriage 28. The gear 37 cantilevers out from the side of the carriage 28 that is directed toward the bracket 18, and the splined rod 26 is guided through it so that it is rotationally coupled thereto but is slideable axially thereon. The result of this coupling is that the actuation of the motor 22 produces a movement of the slider 32 in the direction C, i.e., at right angles to the bars 13.

Below the plate 34, two pivots 38 and 39 are rotatably supported in adapted blocks which are rigidly coupled to said plate, and two levers 40 and 41 are keyed on said pivots. The levers 40 and 41 are mutually connected by toothed sectors 42 and 43 which are concentric to the pivots 38 and 39, so that the directions of rotation of the levers 40 and 41 are always mutually opposite. For the rotation of the levers 40 and 41 in opposite directions there is a jack 44, in which the cylinder is articulated to the block that supports the pivot 38, while the stem is articulately connected to a radial arm 45 which is rigidly coupled to the lever 41.

The cylinders of two respective jacks 46 and 47 are fixed to the ends of the levers 40 and 41; the jacks have vertical axes, and their stems extend downwards through the levers 40 and 41. The clamps 48 and 49 for gripping the strips that compose the frame are fixed to the lower ends of the stems. The clamps 48 and 49 are identical, and only the clamp 48 is described hereinafter for the sake of brevity.

Figure 13:
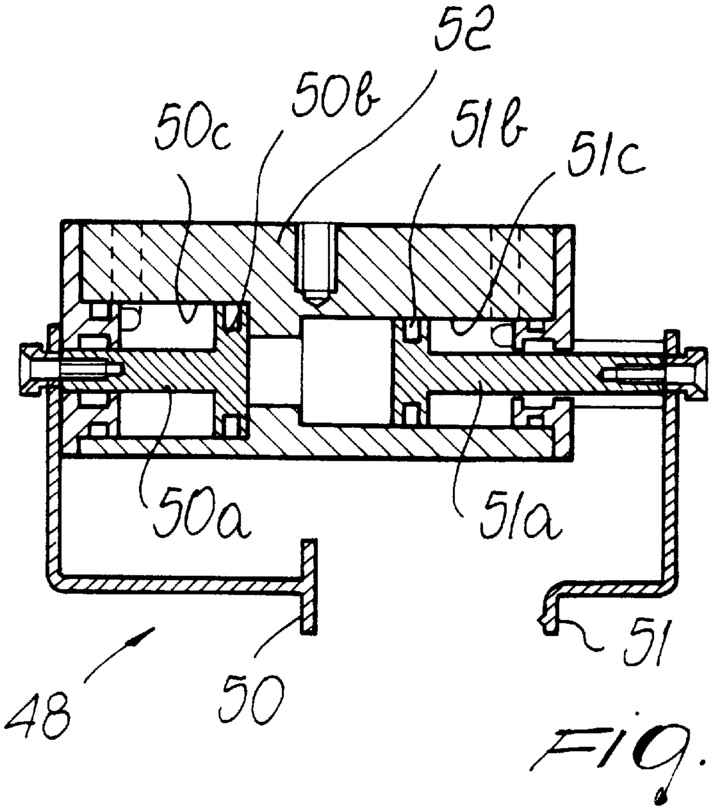
FIG. 13 is a sectional view, taken along the plane XIII—XIII of FIG. 12.
Figure 12:
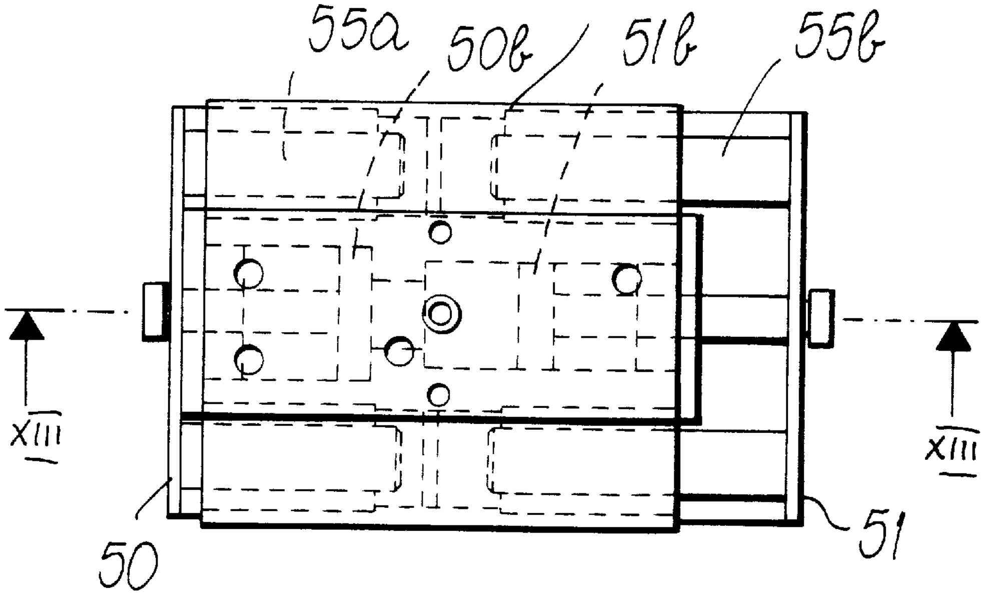
FIG. 12 is a plan view of the grip elements.

As shown more clearly in FIGS. 12 and 13, the clamp 48 comprises two jaws 50 and 51 which are rigidly coupled to the stems 50*a*, 51*a* of two respective pistons 50*b*, 51*b* having different diameters and arranged in coaxial seats 50*c*, 51*c* of a prism-shaped body 52. The body 52 is rigidly coupled to the lower end of the stem of the jack 46, so that the stems 50*a*, 51*a* have a horizontal axis which is perpendicular to the axis of the jack 46. The reference numeral 54 designates two rods which are parallel to the jack 46, are fixed to the body 52 and prevent the rotation of the body 52 by sliding in adapted seats of the lever 40.

Two rods 55*a*, 55*b* are likewise rigidly coupled to each jaw 50, are parallel to the stems 50*a*, 51*a* and are guided in the body 52, preventing the rotation of the jaws 50, 51.

The unit designed to pick up the strips which is fitted to the other carriage 29 is fully identical to the one fitted to the carriage 28 and described above in relation to said carriage. In particular, the reference numeral 56 designates a rack which is fixed to the plate 35 at right angles to the bars 13 and with which a gear 57 meshes (see FIG. 7), the gear being supported rotatably so that it cantilevers out toward the bracket 19 in the carriage 29. The splined rod 27 is driven through the gear 57 so that it is slideable axially but is rotationally rigidly coupled thereto.

The two levers 58 and 59 are articulated below the plate 35 that constitutes the slider 33, are mutually connected by toothed sectors 60 and 61 and can be actuated in opposite directions by way of a jack 62.

Vertical jacks 63 and 64 are fixed to the ends of the levers 58 and 59, and their stems support jacks 65, 66 for actuating grip clamps 67, 68 in the same manner as described above with reference to the clamps 48 and 49.

It should be noted that the two units fitted on the sliders 32 and 33, in addition to picking up two strips 41, 42 and 43, 44 each from respective magazines, arrange them at 90° to each other, forming two L-shaped elements S1, S2 (see FIG. 1) which in a subsequent step are arranged mutually adjacent so as to form the rectangular frame.

The mutually adjacent arrangement is achieved by moving the two carriages 28 and 29 along the bars 13. For this purpose, the two parallel portions of a belt 71 (FIG. 7) which surrounds the pulleys 20 of the bracket 18 and the pulleys 21 of the bracket 19 are rigidly coupled to lateral faces 69 and 70 of the carriages 28 and 29. The belt 71 is guided by a pair of idle pulleys 72 and 73 in a lateral expansion 74 of the box-like body 11 and around a driving pulley 75 which is keyed on the output shaft of a reversible motor 76 which is mounted on an expansion 74 to the side of the motor 10 that motorizes the beam 12.

From the above description it is evident that by actuating the motor 76 the two portions of the belt 71 that are parallel to the bars 13 move in opposite directions, so that the two carriages 28 and 29 move closer one another or apart according to the direction of rotation of the motor 76.

Figure 4:
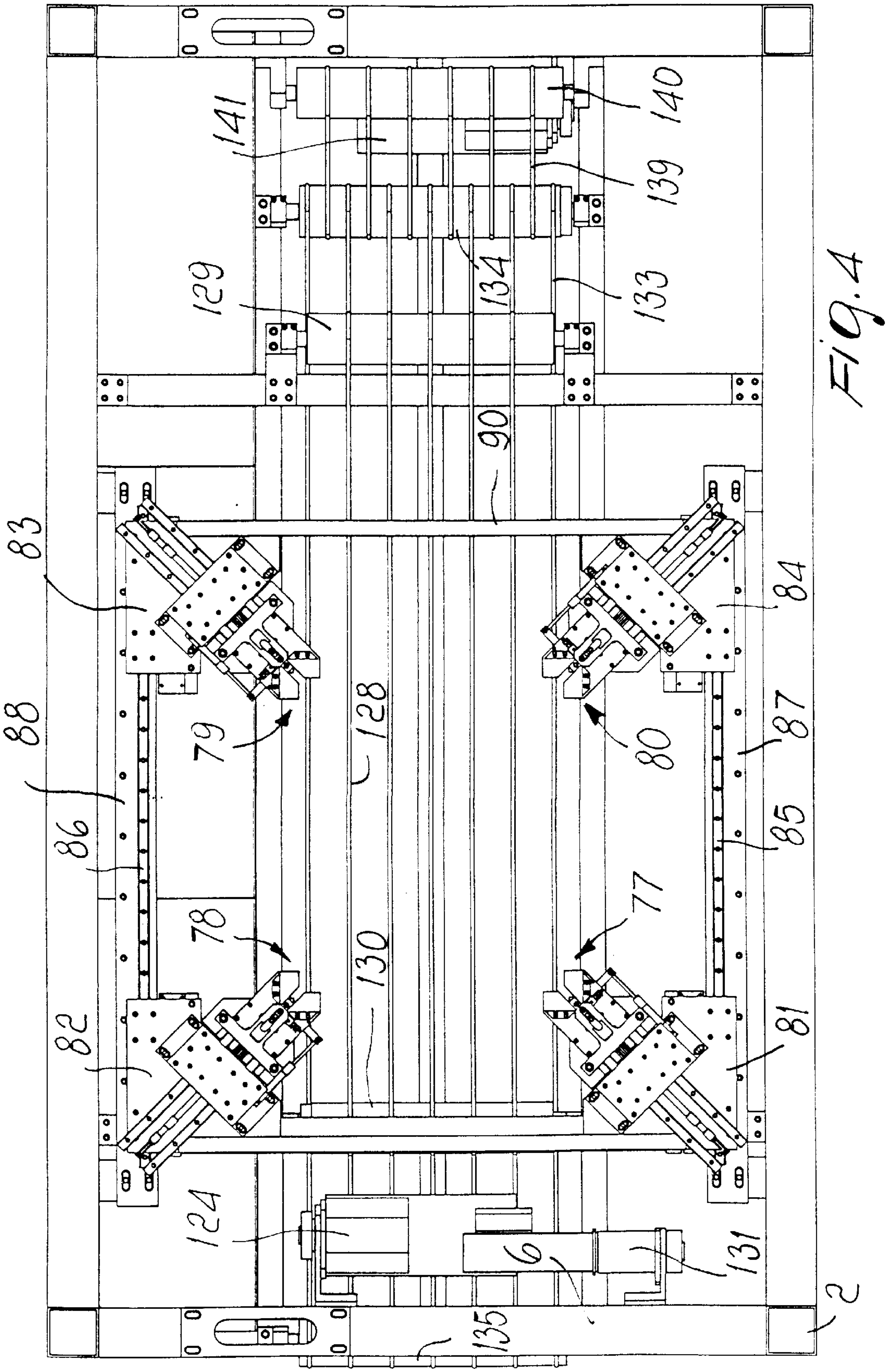
FIG. 4 is a plan view, taken along the plane IV—IV of FIG. 2.

Once the strips L1–L4 have been arranged so as to form a frame, the strips are mutually joined at the corners by joining elements which are driven into them so as to straddle the joints formed by the strips in four stapling machines 77, 78, 79 and 80 (see FIGS. 1 and 4).

The stapling machines 77–80 are all mutually identical and are fitted on four respective angular plates 81, 82, 83 and 84. The plates 81, 84 and 82, 83 are slideable on two rails 85, 86 which are mutually parallel and are fixed on flat strips 87, 88 which are rigidly coupled to the upper longitudinal members 4 of the framework. The plates 81, 82 and, respectively, 83, 84 are furthermore rigidly connected to each other by cross-members 89 and 90.

Figure 11:
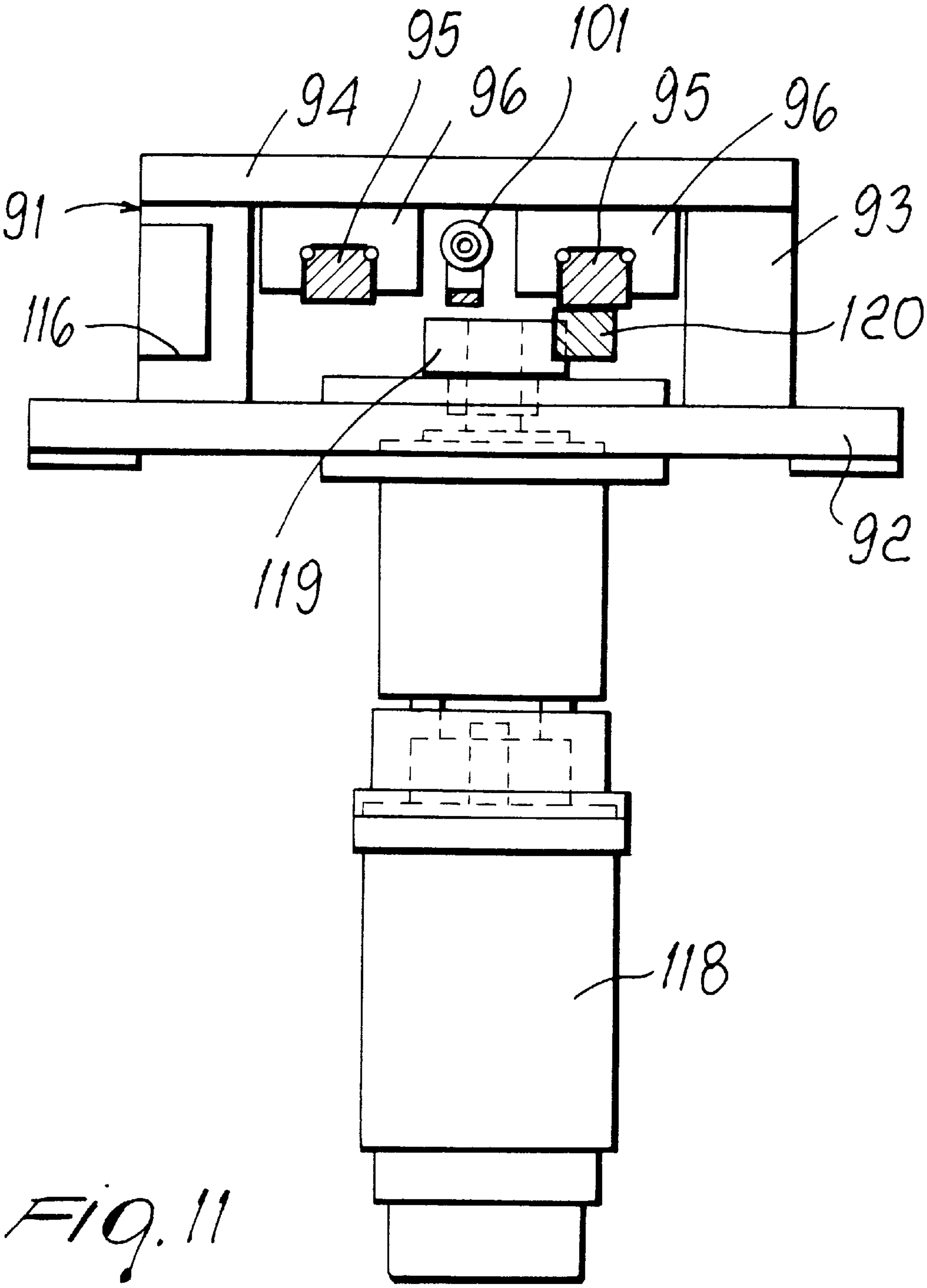
FIG. 11 is a sectional view, taken along the plane XI—XI of FIG. 9.

Each stapling machine 77–80 (see FIGS. 8–11) comprises a support 91 which is composed of a base 92 which is fixed diagonally on the plate 81–84 and from the sides whereof two shoulders 93 rise; such shoulders are connected, at the top, by a plate 94, so that a passage is formed through which two parallel rails 95 are made to pass. As shown in FIG. 11, the rails 95 are guided so that they are slideable in U-shaped supports 96 which are fixed below the upper plate 94 and are fixed on a triangular bracket 97. A pneumatic cylinder 98 is coupled below the triangular bracket 97 by means of a flange and is adapted to fire the elements for joining the strips that compose the frame by means of a firing pin 99 which is propelled upwards by the cylinder 98 through a slot 100 of the corner region of the bracket 97. In a known manner, in the stapling machines the joining elements are conveyed, in the form of staples, shaped plates or the like, from a magazine 101 which is arranged between the rails 95 above the firing pin 99, which inserts them transversely, i.e., in a straddling configuration, in the joint of two strips L1, L2 and L3, L4 arranged at 90°. The rails 95 extend onto the bracket 97 and a table 102 is guided thereon above the bracket and is fixed on two carriages 103 which slide on the rails 95. A slot 104 which is parallel to the rails 95 and is aligned with the firing pin 99 is formed in the table 102.

The bracket 97 forms, to the sides of the table 102, two regions in which two vertical stems 105 are guided; said stems are connected, at the top, by a cross-member 106. The stems 105 belong to respective jacks, cylinders 107 whereof are fixed under the bracket 97. The cross-member 106 has, in a median region, a beak 108 in which a slot 109 is formed. An L-shaped presser 110 can be arranged along the slot 109, lies below the beak 108 and the angle designed by its wings is aligned above the firing pin 99. The presser 110 is meant to lock on the table 102 the two strips L1, L2 and L3, L4 that form each L-shaped element S1, S2 of the frame.

The arrangement of each pair of strips at right angles is ensured by a pair of locators 111 which are constituted by bars which are fixed on the table 102 so as to form a 90° angle of which the slot 104 constitutes the bisecting line.

Proximate to the vertex of the right angle formed by the locators 111 there is an elastic tab 112 which lies transversely on the slot 104 and is rigidly coupled to a block 113 which is fixed on the table 102.

The table 102, by sliding on the rails 95, is movable with respect to the bracket between a forward position and a retracted position. In the forward position, the firing pin 99 lies outside the right angle formed by the locators 111, while in the retracted position it lies inside said angle.

The movement of the table 102 between the forward position and the retracted position occurs in contrast with the action of a cylindrical spring 114 which acts between an arm 115, which is rigidly coupled to the table 102, and a coupling 116 which is rigidly coupled to the rear part of the bracket 97. It should be noted that a cavity 117 for receiving the coupling 116 is formed in the shoulder 92.

Each stapling machine 77–80 is station move towards or away from the diagonally opposite stapling machine in order to allow to arrange the strips of the frame in the shape of a rectangle. Once the strips have been assembled by the stapling machines 77 and 78 so as to form a frame, the release of said frame occurs by moving the pair of stapling machines 77, 78 and the pair of stapling machines 79, 80 mutually apart. The approach and spacing of the diagonally opposite stapling machines is achieved by means of a reversible motor 118, which is coupled by means of a flange under the base 92 and has a vertical shaft which protrudes upwards between the rails 95. A pinion 119 is keyed on the shaft and meshes with a rack 120 which is fixed under a rail 95. The rotation of the motor 118 in one direction or the other causes the movement of the bracket 97 and of all the elements that said bracket supports.

When a frame is completed by mutually joining the strips, it is released onto a conveyor which moves it away.

Figure 14:
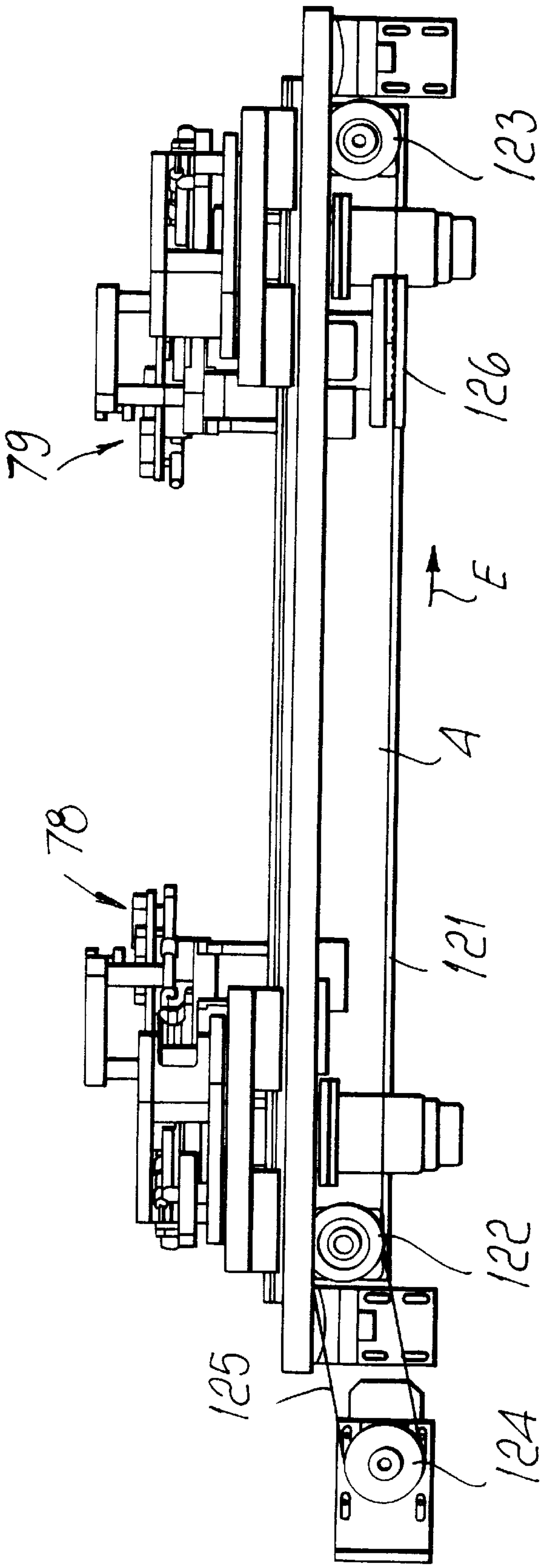
FIG. 14 is a view of a detail of the apparatus; and finally

Release occurs by moving the pair of stapling machines 79 and 80, which are joined by the cross-member 90, along the rails 85 and 86 away from the pair of stapling machines 77 and 78, which are joined by the cross-member 89. The movement is provided (see FIG. 14) by means of a toothed belt 121, which is closed in a loop on two idle pulleys 122, 123 fitted so as to cantilever out from the longitudinal member 4, and is actuated by a motor 124 by means of an additional transmission belt 125. The belt 121 has two portions which are parallel to the direction E, and the stapling machine 79 is coupled to the lower one of said portions by means of a clamp 126. Although this is not indispensable in order to allow the release of the assembled frame, it is possible to provide a similar engagement of the stapling machine 78 with the upper portion of the belt 121, so that since the two portions of the belt 121 move in opposite directions the stapling machines 77 and 78 are simultaneously moved apart or closer with respect to the stapling machines 79 and 80.

Figure 2:
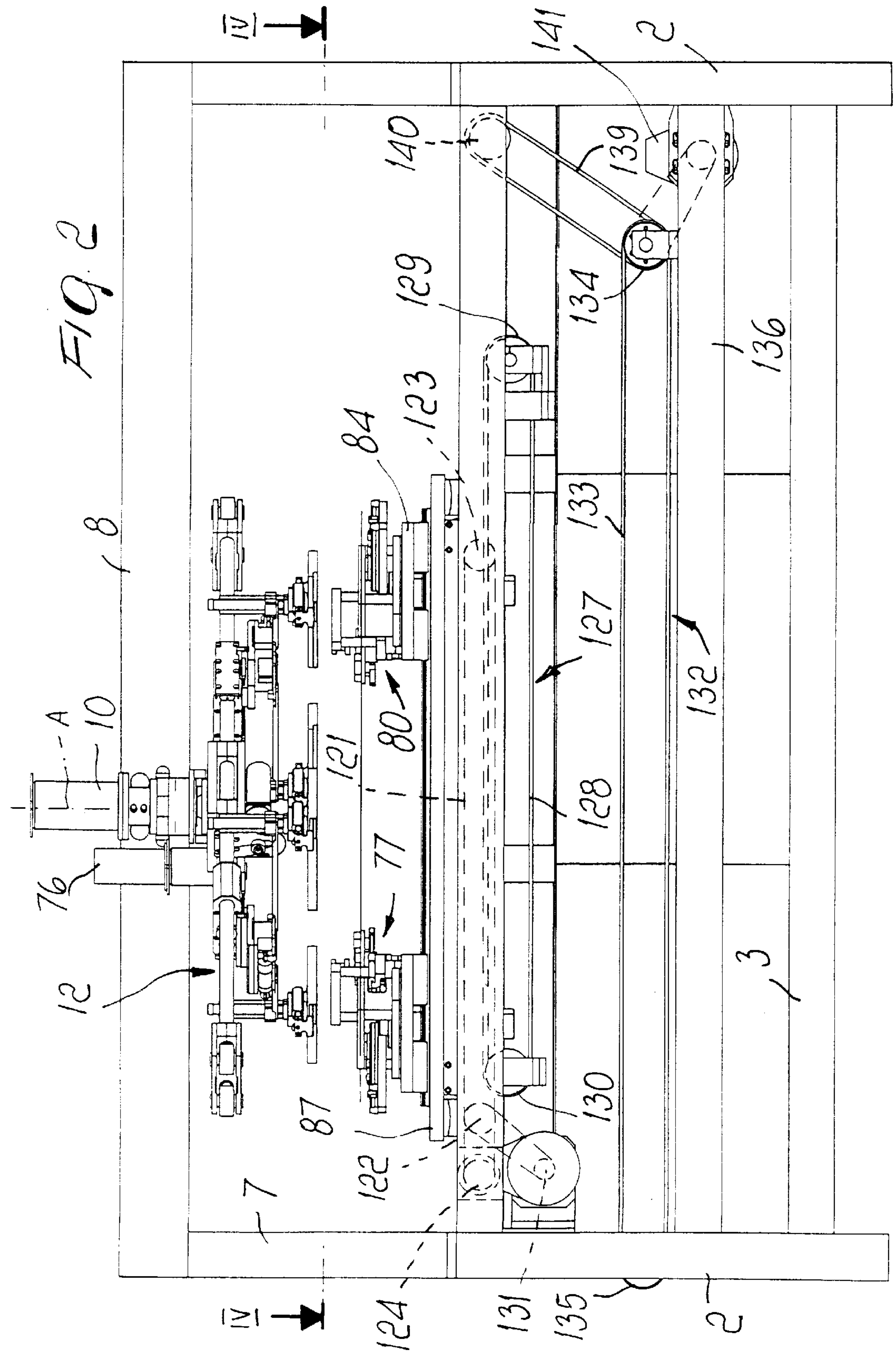
FIG. 2 is a lateral elevation view of the apparatus.
Figure 3:
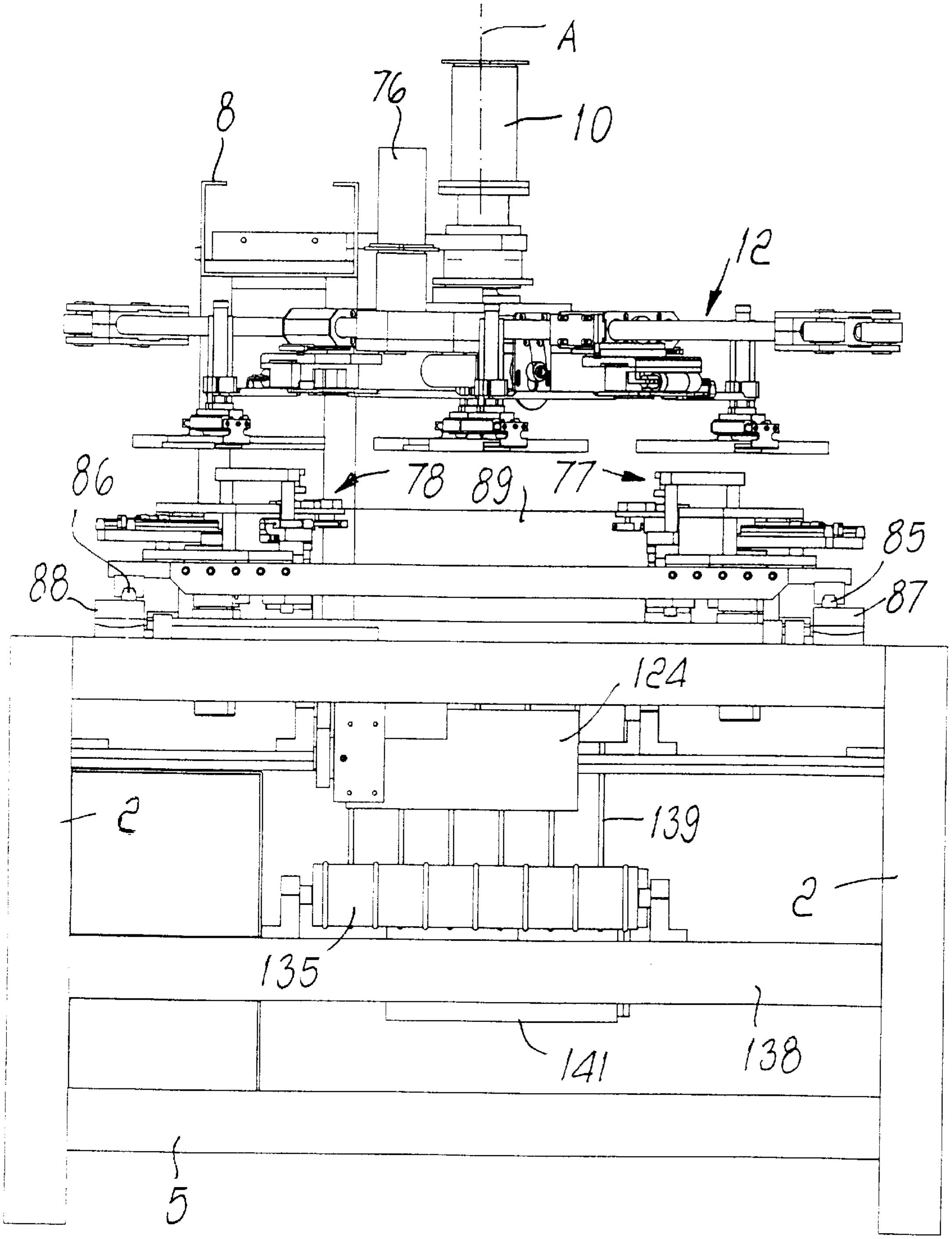
FIG. 3 is a front elevation view of the apparatus.

The conveyor designed to carry away the assembled frame comprises a first conveyor 127 (see FIGS. 1, 2 and 4) which is composed of a plurality of parallel belts 128 which surround two rollers 129, 130 which are supported so that they are rotatable between the longitudinal members 4. The upper portions of the belts 128 form a supporting surface located below the stapling machines which is designed to receive the assembled frame and are actuated in the direction E by a motor 131 which actuates the roller 130 and is mounted on the framework 1.

A similar second conveyor 132 is arranged below the first conveyor 127 and is constituted by a plurality of parallel belts 133 which are wound around two rollers 134, 135 so as to form a conveyance surface which is parallel to the plane of the belts 128. The roller 134 is supported on longitudinal members 136 which lie between cross-members 137, 138 arranged above the cross-members 5, while the roller 135 is supported directly on the cross-member 138.

The second conveyor 132, on the side of the roller 134, extends beyond the roller 129 of the first conveyor 127. An additional plurality of belts 139 surrounds the roller 134, between the belts 133, and also surrounds a roller 140 which is supported on the cross-member 6 that joins the longitudinal members 4 at a certain distance from the roller 129.

The roller 140 lies at a higher level than the conveyance surface of the first conveyor 127 and on a vertical plane which lies further from the roller 134 than the vertical plane that passes through the roller 129. In this manner, the belts 139 are inclined and form an obtuse angle with the belts 133. The roller 134 around which both belts 139 and 133 wind is actuated by a motor 141 (see FIG. 1) so that the upper portions of the belts 139, 133 move in the direction F, which is opposite to the direction E.

Figure 5:
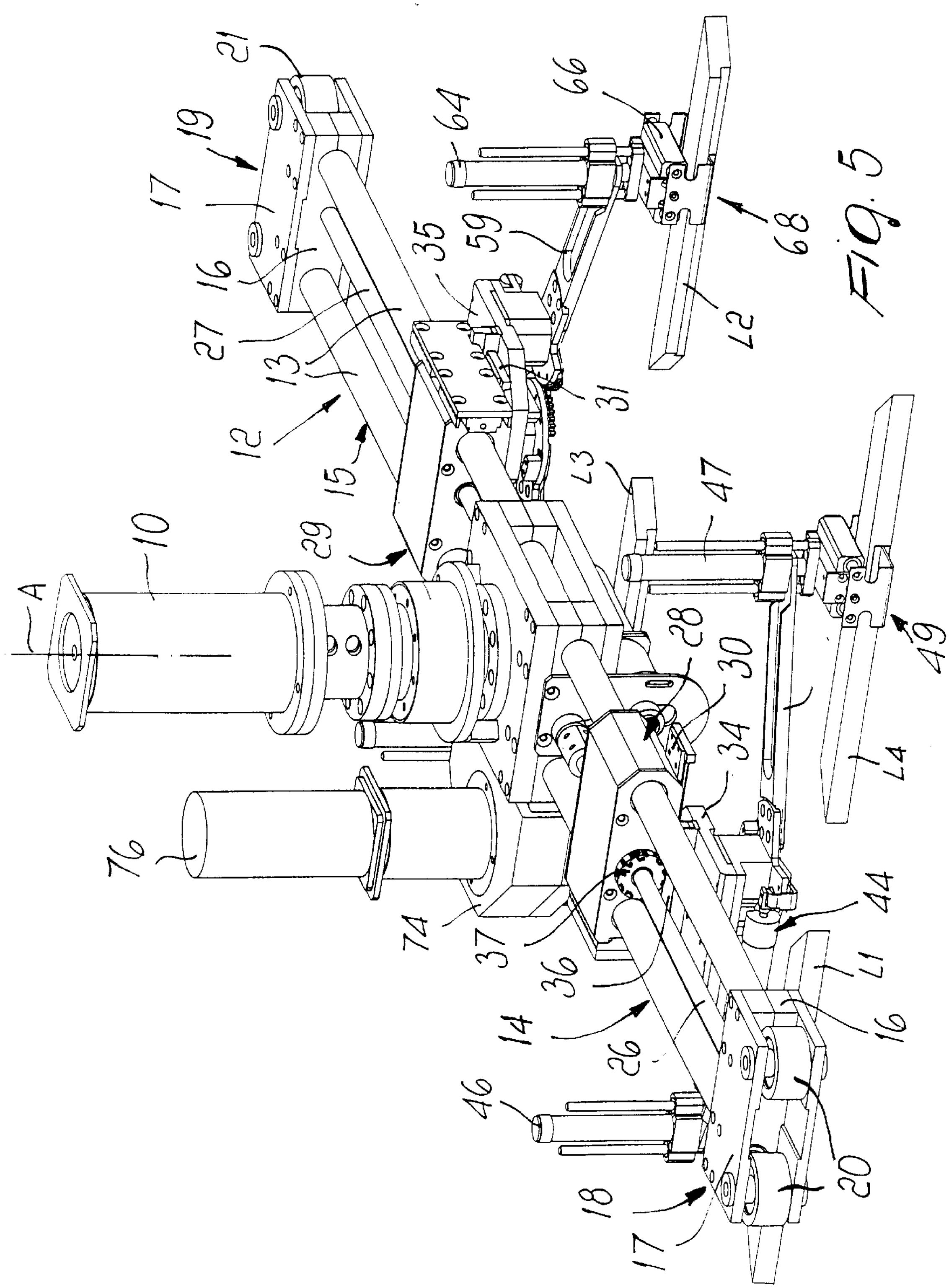
FIG. 5 is a top perspective view of the upper part of the apparatus.
Figure 6:
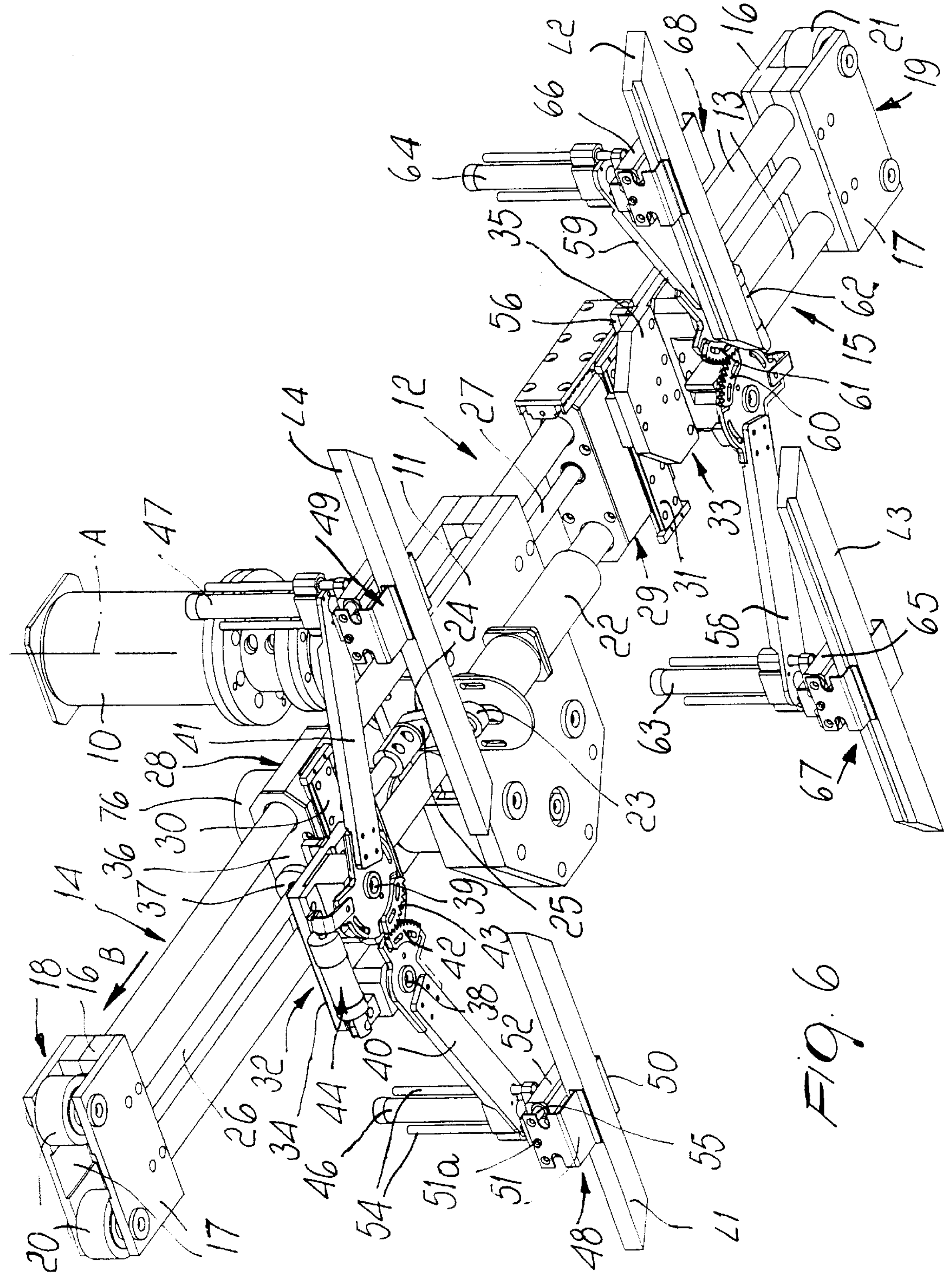
FIG. 6 is a bottom perspective view of the upper part of the apparatus.

The operation of the described apparatus is as follows. Assume that one is to produce a rectangular frame composed of four strips L1, L2 and L3, L4 whose ends are cut at 45° and in which the two shorter strips are designated by L1 and L2 and the two longer strips are designated by L3 and L4 (FIGS. 5 and 6). Assume, furthermore, that the strips are dispensed from respective magazines (not shown) so that two strips, a long one and a short one, are arranged and aligned at each side of the apparatus and at a level which is intermediate between the level of the clamps 48, 49 and 67, 68 and the level of the stapling machines 77–80.

Figure 7:
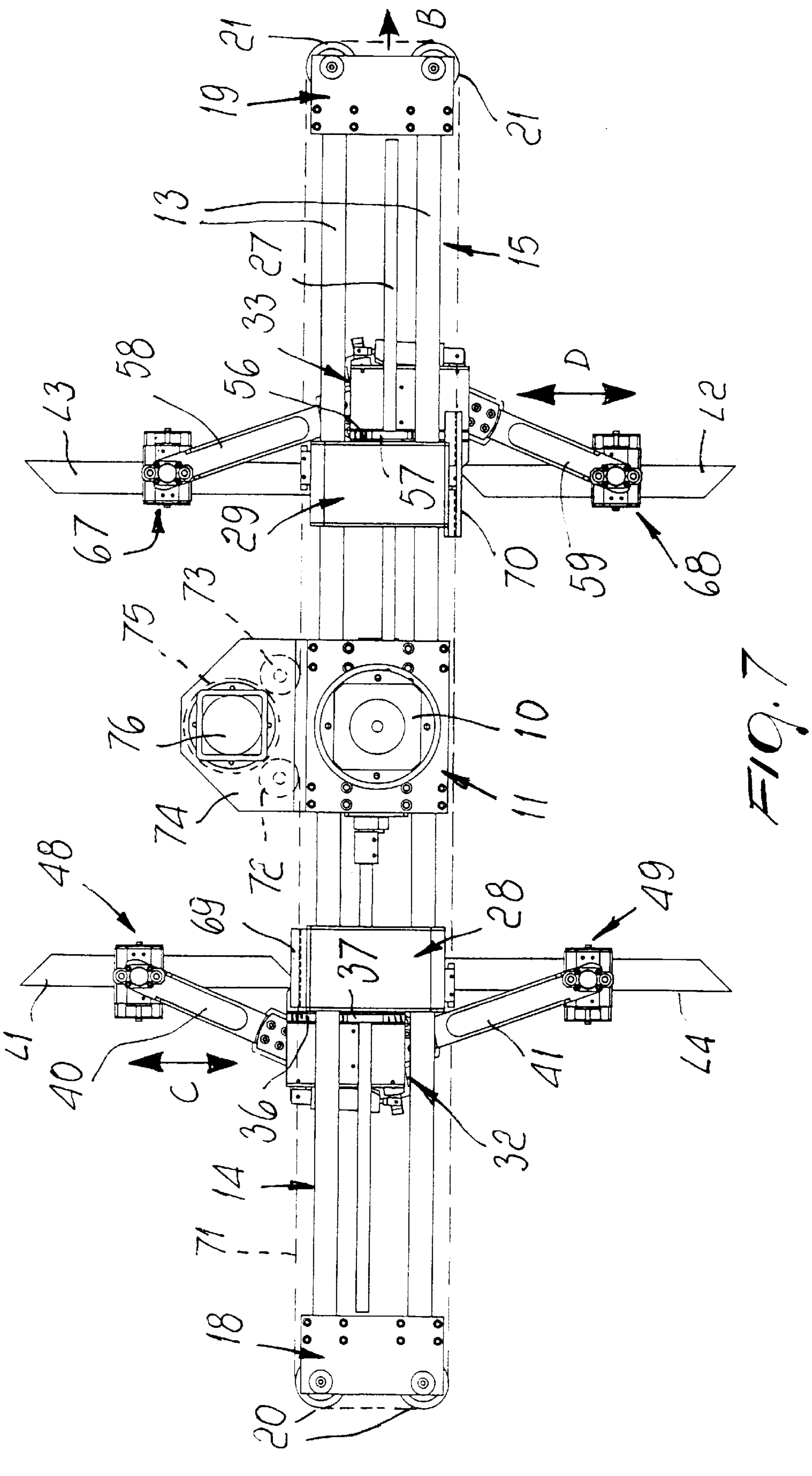
FIG. 7 is a plan view of the upper part of the apparatus.
Figure 8:
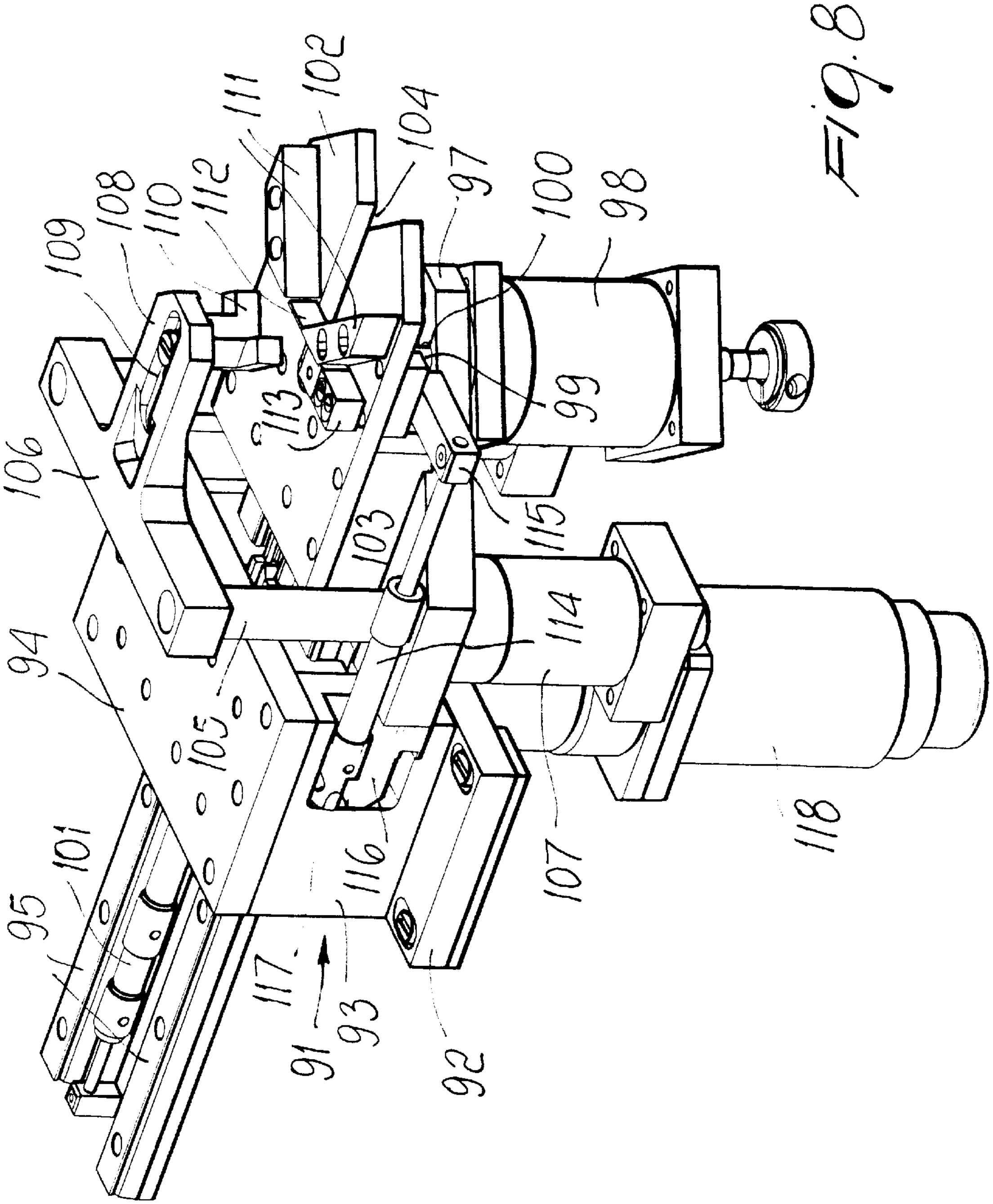
FIG. 8 is a perspective view of a stapling machine.
Figure 9:
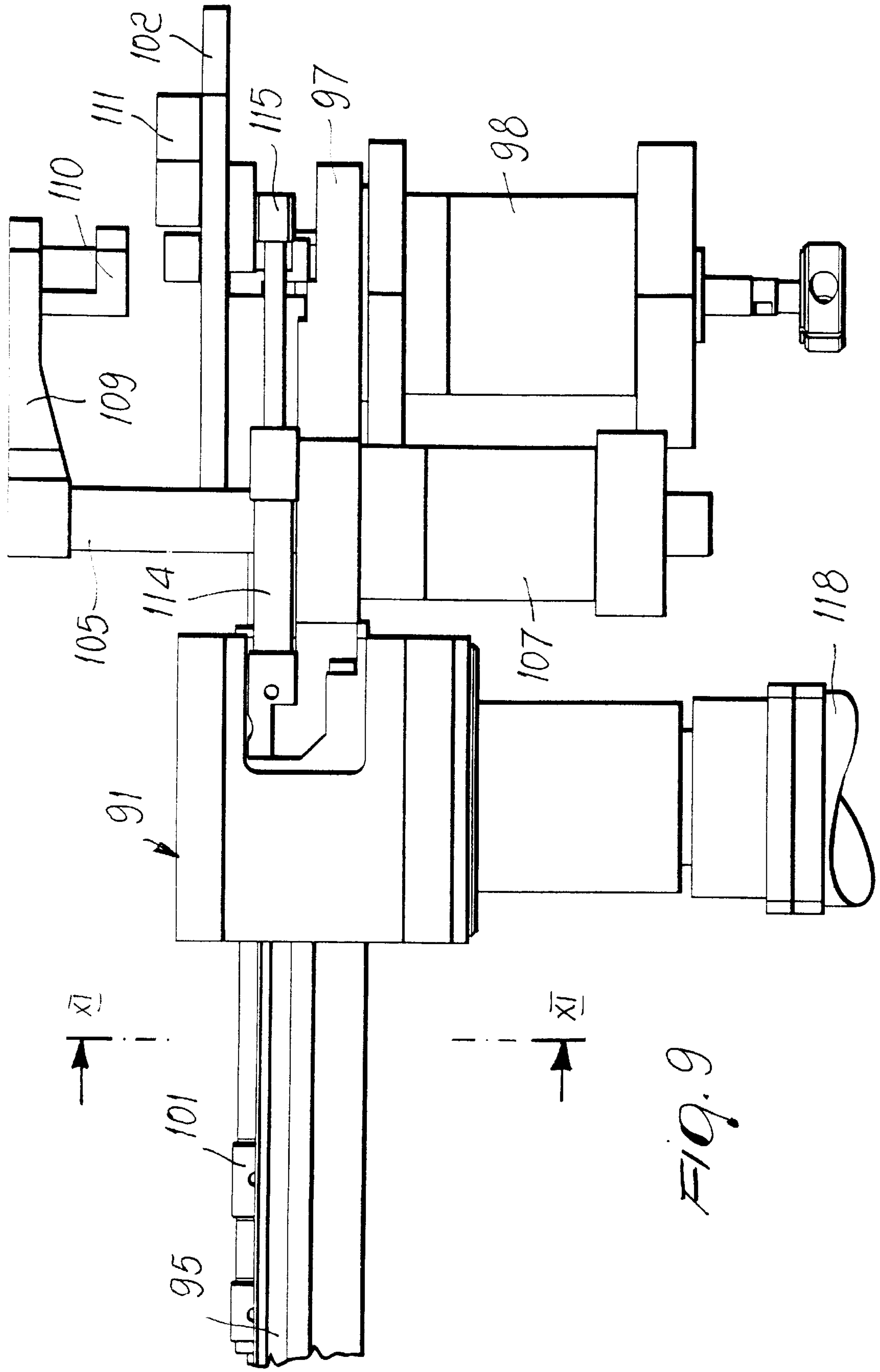
FIG. 9 is a side view of the stapling machine of FIG. 8.
Figure 10:
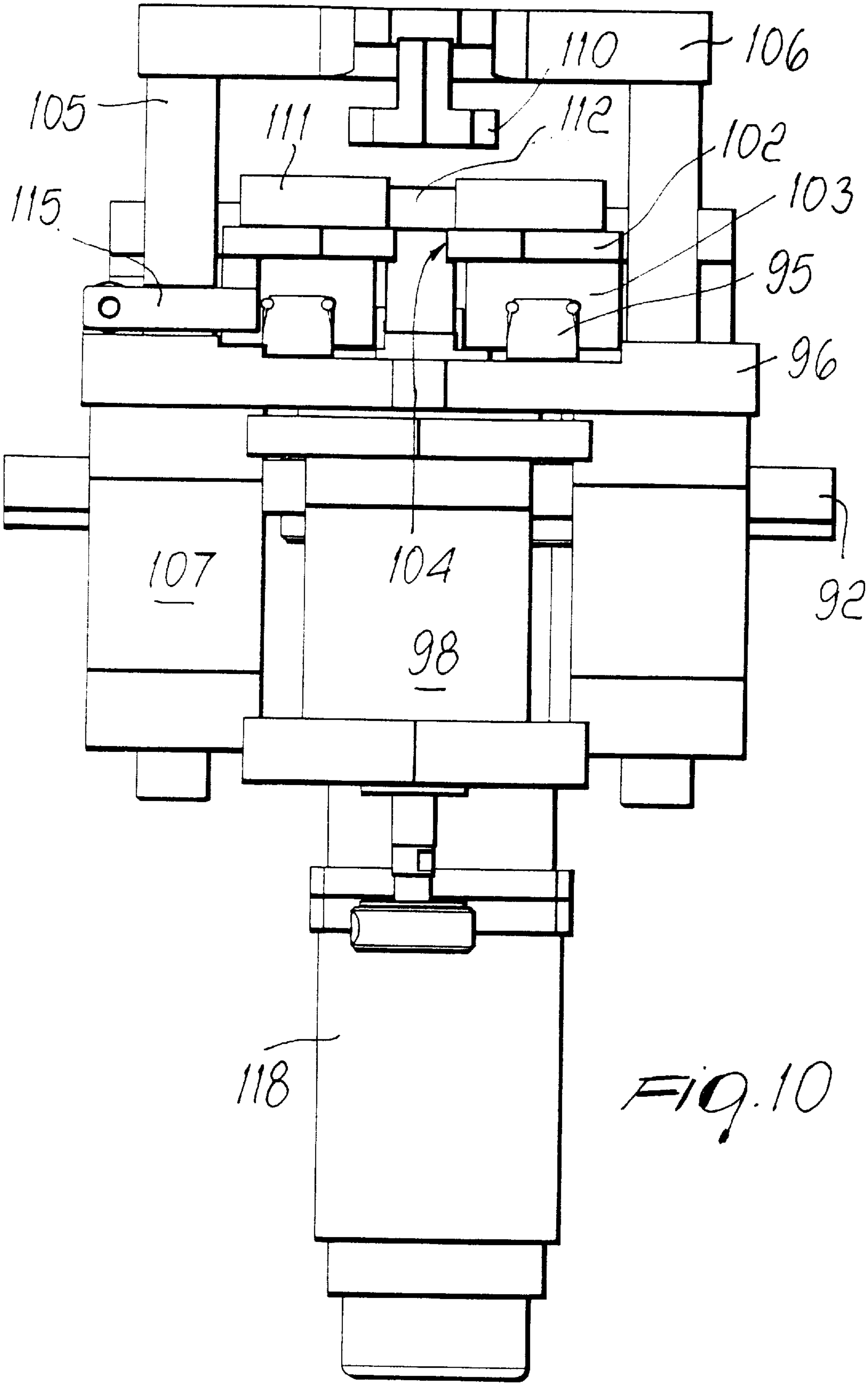
FIG. 10 is a front view of the stapling machine.

FIGS. 5–7 illustrate this kind of situation, in which a short strip L1, L2 is aligned with a respective long strip L3, L4. It should be noted that a long strip L3, L4 lies opposite a short strip L1, L2, that the ends of the strips that are beveled at 45° face each other, and that the faces that will remain in view are directed upwards.

It should also be noted that the vertices of the adjacent ends of the aligned strips are equidistant with respect to the vertical plane that passes through the longitudinal centerline of the beam 12, is perpendicular thereto and passes through the rotation axis A of the beam 12.

By actuating the motor 10, the beam 12 is turned so as to lie at right angles to the strips. Therefore, by actuating the motor 76 with the levers 40, 41 and 58, 59 in the fully open position, the two carriages 28, 29 are moved along the bars 13 until the clamps 48, 49 and 67, 68 lie above the respective strips L1–L4.

At this point, the cylinders 46, 47 and 63, 64 are actuated and the clamps 48, 49 and 67, 68 are lowered into the position for gripping the strips L1–L4; once this position has been reached, the cylinders 52 are actuated, closing the clamps 48 and 49, and the cylinders 65 and 66 are actuated, closing the clamps 67, 68.

When the strips L1–L4 have been gripped by the clamps 48, 49 and 67, 68, they are raised by the cylinders 46, 47 and 63, 64 and then, by way of the rotation of the levers 40, 41 and 58, 59 by the jacks 44, they are arranged at right angles with their beveled faces in mutual contact.

In particular, the strip L1 forms an L-shaped element S1 with the strip L4, while the strip L2 forms a diagonally symmetrical L-shaped element S2 with the strip L3.

By rotating the beam 12, the L-shaped elements S1, S2 are orientated so that the strips L3, L4 are parallel to each other and to the direction E of the belts 128.

At the same time, the motor 22 is actuated and, by way of the splined rods 26 and 27 and the gears 37 and 57 which mesh with the racks 36 and 56, moves the sliders 32, 33 at right angles to the beam 12 and in mutually opposite directions unit the ends of the strips of one L-shaped element S1 lie exactly opposite the ends of the other L-shaped element S2 and are equidistant with respect to the longitudinal centerline plane of the beam 12.

With this orientation, the motor 76 is actuated so as to move mutually closer the L-shaped elements S1 and S2 until their ends are moved into mutual contact so as to form a frame. By actuating the jacks 46, 47 and 63, 64, the frame is lowered onto the stapling machines 77–80, which are arranged beforehand on the framework so that the corners of the frame, by loosening the clamps 48, 49 and 67, 68, are deposited onto the portions of the tables 102 that are delimited by the locators 111 and in front of them.

While the beam 12 and the elements fitted thereon are returned to the position for picking up a new series of strips, the motors 118 of the stapling machines are actuated and, by virtue of the engagement of the pinions 119 on the racks 120, move the diagonally opposite stapling machines toward each other.

With a first mutual approach stroke, the corners of the frame are made to abut against the elastic tabs 112 so as to make the corners of the strips mate perfectly.

The subsequent approach stroke causes the strips to rest against the locators 111 and moves the tables 102 in contrast with the return action applied by the springs 114. When the corners of the frame are aligned above the firing pins 99, the jacks 107 are actuated, lowering the presser 110 onto the strips and locking them onto the table 102.

At this point the cylinders 98 are actuated, and their firing pins 99 insert the joining elements so as to straddle the joint formed by the adjacent arrangement of the faces of the strips that are beveled at 45°.

Once the mutual fixing of the strips has been completed, the pressers 110 are raised and the stapling machines are retracted in order to release the assembled frame, whose corners however continue to rest on the tables 102. Then the motor 124 is actuated and, by means of the belt 121, moves the pair of stapling machines 79, 80 away from the stapling machines 77, 80, so as to allow the frame to fall onto the underlying belts 128 of the conveyor 127 and be conveyed toward the belts 139. Due to the friction applied by the belts 139 to the front strip, the frame is overturned and deposited upside down on the belts 133 of the underlying conveyor 132 and moved away by it for subsequent completion operations, such as applications of a glass plate and a backing panel and of elements for retaining them.

It is evident that the apparatus according to the invention perfectly achieves the intended aim and objects. In particular it should be noted that the movable elements supported on the beam 12 are controlled by a computer which synchronizes their movements in order to optimize the performance of the apparatus.

A main prerogative of the apparatus is constituted by the fact that it can be programmed to work even in succession on frames having different dimensions.

Numerous modifications and variations are possible in the practical embodiment of the invention, and they are all within the scope of the same inventive concept formulated in the claims that follow.

Figure 15:
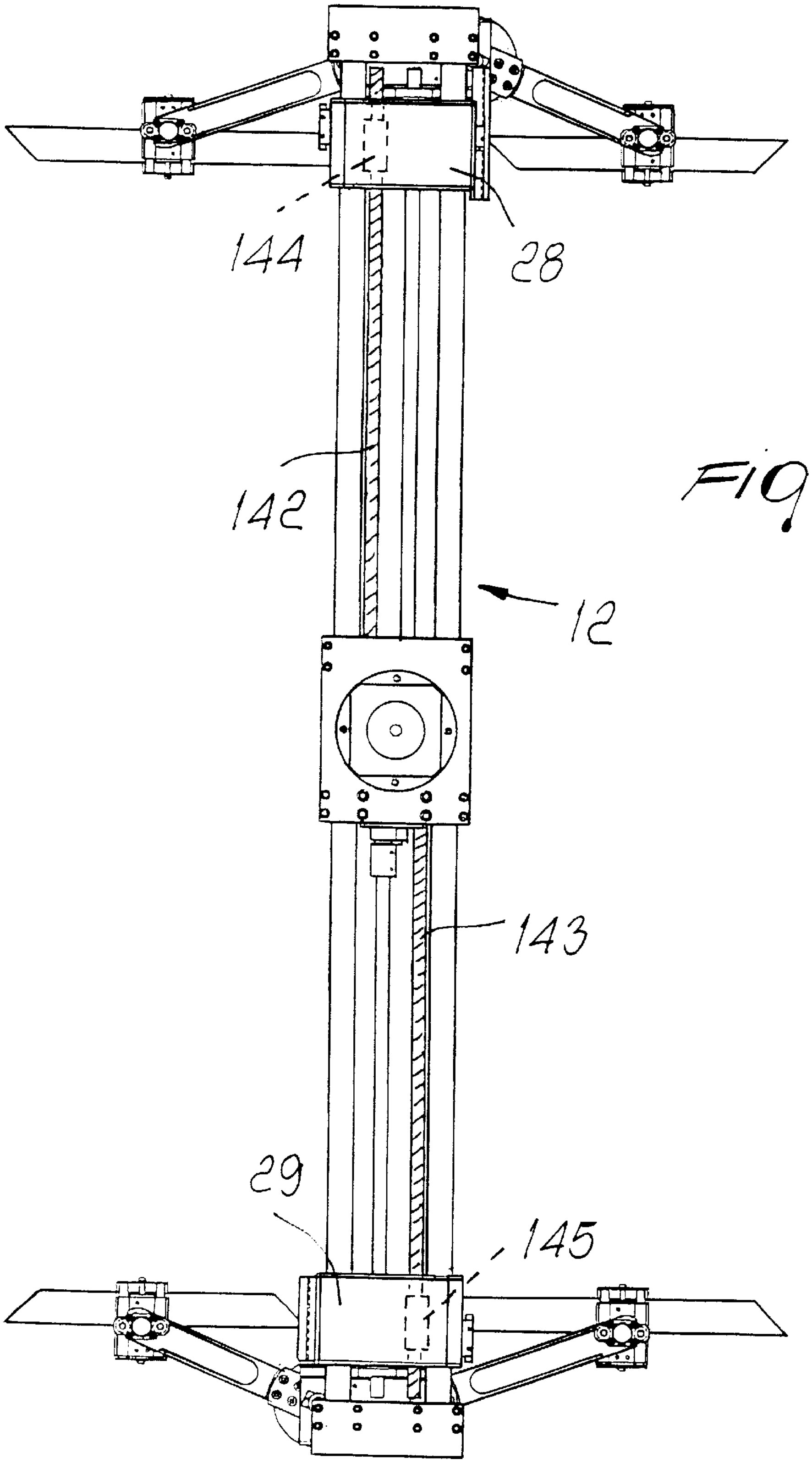
FIG. 15 is a view of another embodiment of the apparatus.

In one of such embodiments, shown in FIG. 15, the mutually opposite movement of the carriages 28 and 29, instead of being provided by a belt drive 71 as in the above described example, is performed by a transmission which is composed of two rods 142 and 143 which are threaded and parallel to the bars 13 and are actuated by a motor assembly which is arranged centrally with respect to the beam 12. The rods 142, 143 are engaged in bushes 144, 145 of the ballscrew type which are accommodated in the carriages 28 and 29 so that by actuating the motor assembly in one direction or the other the carriages move in mutually opposite directions.

The disclosures in Italian Patent Application No. BO99A000289 from which this application claims priority are incorporated herein by reference.

What is claimed is:

1. An apparatus for manufacturing rectangular frames composed of strips which are assembled by way of mutual joining elements which are driven into said strips by stapling machines so as to straddle joints formed by mating said strips at right angles, comprising: a horizontal beam, which is supported so that it is rotatable centrally about a vertical axis so as to form two arms which lie diametrically with respect to said vertical axis, each arm of said two arms being provided with sliding guides for respective carriages; two levers, which are articulated to each one of said carriages about axes which are parallel to said vertical axis; a grip element for a respective one of said strips that constitute said frame being mounted on each one of said levers; means for actuating said grip elements, said levers, said carriages and said beam so that in a first position of said beam, said grip elements are located in a position for picking up the strips to be assembled; in a second position, said levers are rotated so that the strips picked up by the elements of each pair of levers are mated at right angles; in a third position, said carriages are mutually adjacent so as to form a frame; and in a fourth position, the corners of said frame are arranged on said stapling machines.

2. The apparatus according to claim 1, wherein each carriage has, at right angles to the direction in which it slides, a guide for a slider for supporting said pair of levers, means being provided for moving said sliders in mutually opposite directions at right angles to the sliding direction of said carriages.

3. The apparatus according to claim 2, wherein motor means of said carriages, said sliders and said stapling machines are controlled by an electronic computer which adapts the apparatus to the size of the frame.

4. The apparatus according to claim 1, wherein the levers of each pair are mutually connected by toothed sectors so that the directions of rotation of said levers are mutually opposite.

5. The apparatus according to claim 1, wherein respective jacks having a vertical axis are provided at the ends of said levers, have stems which extend downwards and support jacks which have a horizontal axis, jaws of a clamp which forms said grip element being rigidly coupled to said stems and to a cylinder of said jacks that have a horizontal axis.

6. The apparatus according to claim 1, wherein said carriages are rigidly coupled to respective parallel portions of a belt which winds around guiding pulleys and is actuated by a reversible motor which is mounted on said beam, so that said carriages are movable in mutually opposite directions.

7. The apparatus according to claim 1, wherein said carriages are actuated in opposite directions by means of a transmission which is composed of two parallel threaded rods which are actuated by a motor assembly which is supported on said beam, said rods being engaged in ballscrew bushes which are arranged in said carriages so that the actuation of the motor assembly in one direction or another produces movement of the carriages in mutually opposite directions.

8. The apparatus according to claim 1, wherein said stapling machines are arranged diagonally opposite on a framework and in that each one of said machines comprises rails which are slideable in supports which are rigidly associated with the framework and a bracket which is rigidly coupled to said rails in order to support a cylinder for actuating a firing pin which is adapted to propel in an upward direction joining elements which are conveyed by a magazine, a table being guided on said rails, in contrast with elastic means, above said bracket, a slot being formed in said table, said slot being parallel to said rails and aligned with said firing pin, a presser being guided vertically on said bracket, being aligned vertically with said firing pin and being actuated so as to lock the strips to be joined onto said table, and wherein two locators for arranging two strips at right angles are arranged on said table at the sides of said slot, means being provided for actuating said bracket between a position for receiving said pair of strips on said table and a locking position in which said pair of strips is locked at right angles against said locators by virtue of said elastic means which act between said bracket and said table.

9. The apparatus according to claim 8, wherein said means for actuating said bracket comprise a motor which is coupled by means of a flange on said framework and has a pinion which meshes with a rack which is fixed onto one of said rails.

10. The apparatus according to claim 9, wherein an elastic element is arranged diagonally to an angle formed by said locators, is rigidly coupled to said table, and is adapted to produce the mating of corners of the pair of strips arranged on said table in front of said locators during the movement of said bracket in said locking position.

11. The apparatus according to claim 10, wherein a first belt conveyor is arranged below said stapling machines and is adapted to receive the frames when the diagonally opposite brackets are moved mutually apart to a position in which the corners of the frames leave said table.

12. The apparatus according to claim 11, wherein a frame overturning unit is arranged at an output end of said first belt conveyor and is composed of a plurality of belts which are adapted to divert the frames arriving from said first belt conveyor toward an underlying second conveyor which is actuated in an opposite direction with respect to said first belt conveyor.

13. The apparatus according to claim 11, wherein the stapling machines are slideable in pairs on two respective rails and are connected in pairs, means being also provided for the actuation of one pair of stapling machines with respect to other pair along said rails in order to space said pair of stapling machines from another pair and release the assembled frame onto said first belt conveyor.

14. The apparatus according to claim 8, wherein the grip elements fitted on each carriage are adapted to pick up a respective pair of aligned strips.

* * * * *